Patented Oct. 18, 1949

2,485,248

UNITED STATES PATENT OFFICE 2,485,248

PRESSURE SENSITIVE ADHESIVES

Frederick K. Watson and Paul Arthur, Jr., Wilmington, Del., assignors to E. I. du Pont de Nemours & Company, Wilmington, Del., a corporation of Delaware No Drawing. Application July 14, 1945, Serial No. 605,184

6 Claims. (Cl. 117—122)

This invention relates to adhesives, and more particularly to pressure sensitive adhesive sheet structures containing a flexible backing coated with a pressure-sensitive adhesive.

Pressure-sensitive adhesives should possess (1) adhesiveness, (2) cohesiveness, (3) pliability over a wide temperature range (usually 0° to +40° C.), (4) resistance to cold flow, and (5) good aging characteristics. Adhesiveness or "tack" is essential and preferably the adhesive should "grab" quickly the surface to which it is applied. Usually the degree of "tack" is controlled by the use of so-called "tackifiers" which are dispersed or dissolved in a cohesive base. Cohesiveness is contributed mainly by the film-forming base of the adhesive and is responsible for the property known as "legs" or "tooth." In the case of adhesive tapes, adequate cohesion, together with sufficient adhesion to the backing, prevents the adhesive from smudging or transferring ("offsetting") to the substrate through failure to strip clean, and at the same time helps to prevent transfer of the adhesive to its backing when the tape is unrolled from a coil. Resistance to cold flow is also largely a result of the cohesive nature of the adhesive base, and this is important because an adhesive subject to cold flow is unable to maintain a tight seal and will ooze out from under its backing when subjected to pressure.

Pressure-sensitive adhesives having the aforesaid desirable properties in a sufficient degree to be commercially practicable have been based, heretofore, almost exclusively upon crude rubber, to which various "tackifying" and plasticizing agents have been added, e. g., rosin, ester gum, waxes, and methyl abietate. Such compositions have usually been satisfactory except for the tendency of rubber to oxidize, degrade, and embrittle on aging. Various substitutes for rubber in pressure-sensitive adhesives have been suggested, but it is believed that heretofore none of them has been commercially successful.

It is, therefore, an object of this invention to provide new pressure-sensitive adhesives to replace those based on rubber. It is a further object of the invention to provide new pressure-sensitive adhesives which are more stable to aging than those based on rubber. A more particular object of the invention is to provide new and useful pressure-sensitive adhesive sheet structures.

These objects are accomplished in accordance with the invention by providing compositions of matter comprising a flexible backing coated with an ethylene/vinyl acetate copolymer in which the mole ratio of ethylene to vinyl acetate is not substantially greater than 5:1, or less than 1:32, said copolymer having admixed therewith, a softener or "tackifier" therefor. Suitable tackifiers are represented by substances selected from the class consisting of substantially non-volatile liquid esters of organic acids (especially octadecandiol diacetate), hydrogenated ester gum resins, and coumarone-indene resins, the copolymer and the modifying agent being present in such proportions that the composition is coherent and normally tacky and pressure-sensitive. The mixture of copolymer and tackifier may be applied to sheets of backing such as cloth, cellophane, cellulose derivatives, glassine paper, metal foil, or synthetic resin foil, to form pressure-sensitive adhesive sheeting. Suitably this may be in the form of tape, which, if desired, may be coiled upon itself to form a roll. In a more specific embodiment, the invention contemplates a pressure-sensitive adhesive sheet comprising a flexible backing having one side thereof coated with a tacky pressure-sensitive adhesive, said adhesive being a mixture containing about 0.05 to 0.25 part by weight of octadecandiol diacetate per part of ethylene/vinyl acetate copolymer having an ethylene:vinyl acetate ratio of from 2:1 to 4:1.

We have found that when ethylene/vinyl acetate copolymers having the aforesaid mole ratio of ethylene to vinyl acetate are intimately mixed with certain coumarone-indene polymers, natural resins, aryl-sulfonamide-formaldehyde resins, or substantially non-volatile liquid organic esters, or with combinations of these in suitable proportions, compositions of matter are obtained which are very sticky or "tacky" at temperatures ranging from 40° C. to below 0° C. Such compositions have excellent cohesion, adhesion to various surfaces, and aging characteristics, and are practically odorless and colorless (depending, naturally, upon the type and proportions of modifying agents used). Thus, when an ethylene/vinyl acetate copolymer, tackified with octadecandiol diacetate, is applied to a flexible backing such as cloth, metal foil, regenerated cellulose sheeting, or the like, excellent adhesive tapes which can be employed readily in the customary manner, and which can subsequently be stripped from most surfaces such as those of glass, metal, plastics, wood, or the skin of a person's body, without "transferring" the adhesive thereto, are obtained.

The ethylene/vinyl acetate copolymers which may be used in this invention are described in the patent application of W. E. Hanford and J. R. Roland, Serial No. 446,116, filed June 6, 1942, now abandoned. While such copolymers having mole ratios of ethylene to vinyl acetate of as high as 5:1 and as low as 1:32 are operative in the invention, copolymers in the range of about 4:1 to 1:4, and especially those of 4:1 to 2:1 mole ratio are preferred. These ethylene/vinyl acetate copolymers are advantageous because they do not need a great deal of modification to secure the necessary degree of tackiness and adhesiveness, but "tackifiers" should be employed with them to make the compositions sufficiently soft and tacky to adhere satisfactorily to various surfaces at temperatures ranging from below 0° C. to 40° C. Ethylene/vinyl acetate copolymers having ethylene/vinyl acetate ratios below 2:1 possess more or less residual "tack" per se, and require only minor proportions of modifying materials to make them good pressure-sensitive adhesives.

The tackifiers used in this invention need not be compatible with the ethylene/vinyl acetate copolymers with which they are used, for satisfactory pressure-sensitive adhesives are obtained when the ingredients are merely intimately dispersed one in the other. However, for the best results, we prefer to use combinations of ingredients which are compatible and which therefore form clear, transparent, homogeneous films when spread, for example, on a glass plate. Compatibility is particularly desirable when the adhesive is to be used for making "Scotch tape," i. e., a roll or sheet comprising a transparent, flexible backing such as cellophane or cellulose acetate with a coating of the adhesive on one side. Obviously, the appearance if not the usefulness of such transparent tape would be impaired were the adhesive composed of an incompatible mixture which would at best have poor transparency.

Examples of materials which may be used as tackifiers in this invention are hydrogenated ester gums, coumarone-indene resins, esters of abietic acid, dodecyl benzoate, cetyl levulinate, alkyl phthalates, alkyl sebacates, toluene-sulfonamide-formaldehyde resins, and butyl phthalyl butyl glycolate (Santicizer B-16), castor oil, blown castor oil, acetylated castor oil, butyl acetyl ricinoleate, and natural resins such as rosin, copals, and damar. However, an outstandingly superior tackifier for use in connection with ethylene/vinyl acetate copolymers having an ethylene/vinyl acetate ratio of from 4:1 to 2:1 is octadecandiol diacetate.

If desired, other film-forming materials may be blended with ethylene/vinyl acetate copolymers to form the cohesive base for pressure-sensitive adhesives. Such blends may not only form the basis of good adhesives, but in certain instances may also be cheaper than ethylene/vinyl acetate alone would be. Examples of such modifiers are rubber, synthetic rubber, polyisobutylene (especially the low molecular weight grades), polyvinyl acetals (especially butyrals), nitrocellulose, cellulose acetate, ethyl cellulose, vinyl chloride/vinyl acetate copolymers, and polyvinyl chloride. In some cases it may be necessary to add tackifiers and/or softeners to these blends; in other cases, the blends may be sufficiently tacky and adherent without further modification. If desired, pigments, disinfectants, etc., may be added to the adhesive compositions to render them opaque or to make them sterile and antiseptic, as for use in surgical or antiseptic tape. The adhesives and the pressure-sensitive adhesive tapes made according to this invention may also be sterilized by heat or light or by treatment with liquid or gaseous disinfectants.

The selection of particular modifiers will obviously depend a great deal upon the nature of the copolymer to be used with them, and with the kind of backing upon which the adhesive is to be supported, i. e., whether the backing be of cloth, paper, cellophane, or some plastic such as a cellulose derivative or a synthetic resin. In like manner, the proportions of ethylene/vinyl acetate copolymer, softener and/or tackifier will naturally depend to a large degree upon the peculiar characteristics of each ingredient. In view of these considerations, the invention can best be explained by the following examples, in which, unless otherwise noted, the quantities are given in parts by weight.

*Example 1.*—One hundred parts of a 3:1 ethylene/vinyl acetate copolymer, 76 parts of hydrogenated ester gum, and 76 parts of methyl abietate were dissolved in enough benzene to form a 10% solution. A film of this solution was applied to a strip of cloth previously anchor-coated with a thin film of the polyvinyl acetal known to the trade by the name "Butacite," the purpose of the anchor being chiefly to seal the pores of the cloth to prevent the adhesive solution from penetrating (striking through) to the other side of the cloth. The benzene was allowed to evaporate first at room temperature and finally for 12 hours at 65° C. The coated strip when coiled upon itself to form a roll could be unrolled without transfer or excessive sticking of the adhesive to the back of the cloth. With respect to quick "grab" and adhesion to the skin of the hand, metal, paper, glass, and wood under a variety of conditions, viz., (a) dry at room temperature, (b) wet at room temperature; (c) cold (3° C.), (d) hot (65° C.), this tape was more water resistant than present commercial grade cloth-backed masking tape, and was otherwise equal thereto.

*Example 2.*—Example 1 was repeated using the following composition as the adhesive.

| | Parts |
|---|---|
| Ethylene/vinyl acetate copolymer (3:1 mole ratio) | 100 |
| Neville resin R-16 (a commercial coumarone-indene resin) | 100 |
| Methyl abietate | 200 |

Tests with this adhesive gave results similar to those in Example 1. This adhesive is particularly suitable for temperatures around 0° C.

*Example 3.*—A 28% toluene solution of a mixture of 85% (by weight) ethylene/vinyl acetate (2.3:1 mole ratio) and 15% octadecanediol diacetate (commercially known as "Diolin A") was applied to a paper backing and allowed to dry. The thickness was regulated to give a coating having a thickness, when dry, of approximately 0.005 inch. The coating was tacky and very adherent to glass, metals, "Lucite," and Vinylite. It showed no tendency to oxidize, degrade, or embrittle on storage. The coated paper could be pulled off the surface of the solid without transfer of the adhesive thereto, and could even be used over again. The paper may be precoated with cellulose derivatives, oils, deacetylated chitin, etc., to prevent the adhesive coating from striking through when applied as a solution, or from sticking to the reverse side of the paper backing when it is rolled up upon itself.

*Example 4.*—A strip of cellophane was coated with a 25% toluene solution of a 9:1 (weight ratio) mixture of a 2.3:1 (mole ratio) ethylene vinyl/acetate copolymer and "Diolin A," and allowed to dry thoroughly. The coated strip was transparent, colorless, tacky on the coated side, flexible, and adherent to smooth-surfaced objects, e. g. glass, paper, wood, metals, and plastics. It could be stripped from these surfaces (except paper) without transfer, resembling "Scotch tape." Other flexible, transparent, translucent, or opaque films such as those of ethyl cellulose, cellulose acetate, cellulose acetate butyrate or polyvinyl acetals, can be used as the backing instead of cellophane.

*Example 5.*—Example 5 was repeated using greaseproof paper as the backing, with equally good results.

It will be understood that the examples given above are illustrative rather than limitative. Numerous modifications of the invention will occur to those who are skilled in the art. For instance, the ethylene/vinyl acetate copolymer may be hydrolyzed to a minor extent prior to use, if desired; also minor amounts of polymer components other than ethylene and vinyl acetate may be present in the copolymer without rendering such copolymer inoperative in the present invention.

The adhesive mixtures of this invention may be prepared in any convenient manner, e. g., by dissolving the ingredients in a solvent or mixture of solvents; by milling the ingredients together on cold or heated rolls such as are used for milling rubber; by dispersing the ingredients in aqueous or organic media by stirring or by passage through a colloid mill, either with or without a dispersing agent; or (where this is feasible), by mixing hot melts of the ingredients.

The adhesive coatings may be applied to the backing in any practicable manner, e. g., by application of solutions or dispersions in organic or aqueous media, by calendering milled compositions, by hot melt application, etc.

In addition to their use as pressure-sensitive adhesives, the compositions of matter of this invention may be used for coating trees, shrubs, etc., to protect against climbing insects; in fly paper, joining wood, paper, metals, or plastics, as binders for decalcomania transfers or in other applications requiring tacky, coherent and adherent compositions. Adhesive tapes made according to this invention are useful as "Scotch tape," masking tape, surgical tape, splicing and insulating tapes, etc.

We claim:

1. A pressure-sensitive adhesive sheet comprising a flexible backing having one side thereof coated with an ethylene/vinyl acetate copolymer in which the mole ratio of ethylene to vinyl acetate is within the range of 2:1 to 4:1 said copolymer having admixed therewith about 0.05 to 0.25 part by weight of octadecandiol diacetate as a tackifier, per part of the said copolymer.

2. The article of manufacture set forth in claim 1 in which the said flexible backing is cellophane.

3. The article of manufacture set forth in claim 1 in which the said flexible backing is greaseproof paper.

4. A pressure-sensitive adhesive sheet comprising a cellophane backing having one side thereof coated with an ethylene/vinyl acetate copolymer in which the mole ratio of ethylene to vinyl acetate is about 2.3:1, said copolymer having admixed therewith about 10 to 15 parts by weight of octadecandiol diacetate, said coated sheet being capable of adhering to smooth-surfaced objects and of being stripped therefrom without transfer of the adhesive.

5. A pressure-sensitive adhesive sheet comprising a flexible backing having one side thereof coated with an ethylene/vinyl acetate copolymer in which the mole ratio of ethylene to vinyl acetate is within the range of 5:1 to 1:32, said copolymer having admixed therewith a tackifier of the class consisting of esters of abietic acid, octadecandiol diacetate, dodecyl benzoate, cetyl levulinate, alkyl phthalates, alkyl sebacates, butyl phthalyl butyl glycolate, castor oil, blown castor oil, acetylated castor oil, and butyl acetyl ricinoleate, the quantity of the said tackifier being from 0.05 to 0.25 part by weight per part of the said copolymer.

6. A pressure-sensitive adhesive sheet comprising a flexible backing having one side thereof coated with an ethylene/vinyl acetate copolymer in which the mole ratio of ethylene to vinyl acetate is within the range of 2:1 to 4:1, said copolymer having admixed therewith a tackifier of the class consisting of esters of abietic acid, octadecandiol diacetate, dodecyl benzoate, cetyl levulinate, alkyl phthalates, alkyl sebacates, butyl phthalyl butyl glycolate, castor oil, blown castor oil, acetylated castor oil, and butyl acetyl ricinoleate, the quantity of the said tackifier being from 0.05 to 0.25 part by weight per part of the said copolymer.

FREDERICK K. WATSON.
PAUL ARTHUR, JR.

REFERENCES CITED

The following references are of record in the file of this patent:

UNITED STATES PATENTS

| Number | Name | Date |
| --- | --- | --- |
| 2,017,070 | Lazier | Oct. 15, 1935 |
| 2,177,627 | Drew | Oct. 31, 1939 |
| 2,200,429 | Perrin | May 14, 1940 |
| 2,328,646 | Izard | Sept. 7, 1943 |
| 2,364,875 | Schieman | Dec. 12, 1944 |
| 2,403,465 | Pease | July 9, 1946 |